Jan. 15, 1946.   C. W. WATSON   2,392,960
PROCESS FOR THE DEHYDROGENATION OF ALKENYLCYCLOHEXENES
Filed Oct. 29, 1942
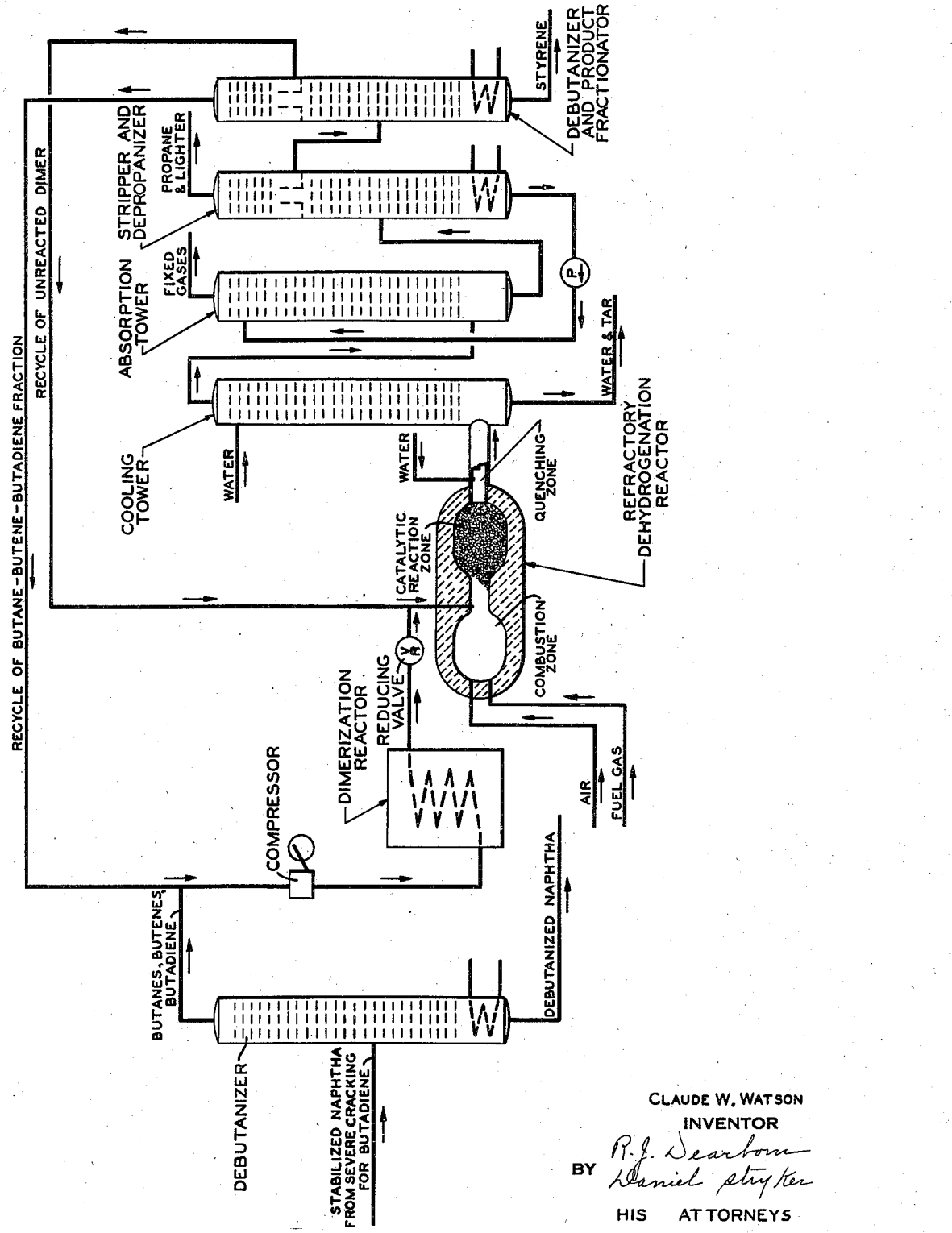
CLAUDE W. WATSON
INVENTOR
BY
HIS ATTORNEYS Patented Jan. 15, 1946

2,392,960

UNITED STATES PATENT OFFICE 2,392,960

PROCESS FOR THE DEHYDROGENATION OF ALKENYLCYCLOHEXENES

Claude W. Watson, Tuckahoe, N. Y., assignor to The Texas Company, New York, N. Y., a corporation of Delaware Application October 29, 1942, Serial No. 463,761

6 Claims. (Cl. 260—669)

My invention relates to the dehydrogenation of alkenylcycloalkenes, and to an improved process for the production of alkenylbenzenes from alkenylcyclohexenes and from conjugated alkadienes.

In view of the fact that conjugated alkadienes, such as 1,3-butadiene, may be prepared from petroleum hydrocarbons, these compounds comprise a potential commercial source of raw material for the production of styrene and other alkenylbenzenes. A conjugated diene may be polymerized under suitable conditions to form a dimer which constitutes an alkenylcyclohexene; thus the dimer of 1,3-butadiene is 3-vinylcyclohexene. Attempts to dehydrogenate this compound to styrene, however, have not been successful. When effecting the dehydrogenation at relatively low temperatures, e. g., 550–650° F., ethylbenzene is obtained, rather than styrene. On the other hand, if the dimer is subjected to temperatures of the order of 1200° F., it depolymerizes to the monomeric butadiene.

An object of the present invention is to provide an improved process for the dehydrogenation of alkenylcycloalkenes.

An additional object of the present invention is to provide a suitable process for the production of alkenylbenzenes by the dehydrogenation of alkenylcyclohexenes.

Another object of this invention is to provide an improved process for the production of alkenylbenzenes from conjugated alkadienes.

A further object of my invention is to provide a practical process for the production of styrene from hydrocarbon fractions containing 1,3-butadiene.

Other objects and advantages of my invention will be apparent from the following description:

In accordance with my present invention, alkenylbenzenes are obtained by the thermal or catalytic dehydrogenation of alkenylcyclohexenes at high temperatures and with contact times sufficiently short to prevent substantial depolymerization of the alkenylcyclohexenes. The thermal dehydrogenation is suitably effected at temperatures of the order of 1200–1600° F.; whereas, the catalytic dehydrogenation may be carried out at somewhat lower temperatures, e. g., 1000–1400° F. The contact time, in either case should be substantially less than one second, and preferably within the range of 0.1 to 0.001 second.

The dehydrogenation reaction may be effected in any suitable high temperature equipment of the type used for cracking petroleum hydrocarbons. However, in view of the high temperatures and short contact times, it may be difficult to obtain the necessary heat transfer in tube furnace type cracking equipment. Other methods of heat transfer which are commonly employed for cracking, are entirely satisfactory for the present purpose, as for example, the use of regenerative furnaces or direct contact flue gas heating. The latter type of operation is particularly adapted for use in my process, and my invention will be specifically illustrated with reference to this method of heating.

My dehydrogenation process may be applied to any alkenylcycloalkene, such as the vinylcyclohexenes and other vinylcycloalkenes. The paramenthadienes, and naturally occurring terpenes of the alkenylcyclohexene class are suitable compounds for dehydrogenation by the present procedure. My process is especially effective in conjunction with the production of alkenylcyclohexenes from petroleum fractions containing conjugated alkadienes, and my invention will be further illustrated with specific reference to the production of styrene from petroleum fractions containing 1,3-butadiene.

One modification of a process for the production of styrene from petroleum fractions is illustrated diagrammatically in the accompanying drawing. In this process, a butane-butene-butadiene fraction is obtained as debutanizer overhead in debutanizing a stabilized cracked fraction which has been subjected to severe cracking for butadiene production. This debutanizer overhead, or other equivalent butane-butene-butadiene fraction, is compressed to a pressure of the order of 400–1200 lbs./sq. in., utilizing the heat of compression to obtain a temperature of 650–950° F., and preferably 750–850° F. Suitable heat exchangers, not shown in the drawing, may be used to adjust the temperature resulting from the particular compression employed. The temperature of the mixture at the above pressure of 400–1200 lbs./sq. in. is then maintained for a sufficient contact time to effect dimerization of the 1,2-butadiene by passing the mixture through an insulated tube bank or other suitable soaking vessel. The contact time for this operation will vary, roughly in inverse proportion to the temperature, and is preferably within the range 20 to 200 seconds for the temperature range specified above.

The dimerization reactor effluent may then be subjected to distillation to obtain a relatively pure dimer fraction, or a fraction of dimer and heavier hydrocarbons, for dehydrogenation in the succeeding step of my process. However, the separation step may be omitted at this stage of the operation, and the entire effluent may then be subjected to dehydrogenation, as shown in the drawing. Thus, the effluent may be introduced into a refractory reactor, where it is contacted with hot flue gas, and then passed through a reaction zone which may suitably contain a dehydrogenation catalyst such as a chromia-alumina catalyst. The flue gas may suitably be generated in a combustion chamber which is formed as an integral structure with the reaction chamber, as shown in the drawing. The amount of flue gas should be sufficient to provide a temperature of 1200–1600° F. in the reaction zone. The dehydrogenation reaction is preferably effected at a total pressure of the order of 1 atmosphere, with the partial pressure of the dimer substantially below 1 atmosphere. For this purpose, it is necessary to employ a pressure-reducing valve to control the flow of the stream from the high pressure dimerization reactor to the low pressure dehydrogenation reactor. The butane and butene content of the charge mixture entering the dehydrogenation reactor, and the flue gas introduced in the dehydrogenation reactor, all serve to reduce the partial pressure of the dimer in the reaction mixture.

The contact time in the dehydrogenation reaction zone may be varied to a considerable extent, roughly in inverse proportion to the temperature employed, but is preferably maintained within the limits of 0.1 to 0.001 second. In any case, the contact time should be substantially less than 1 second, and sufficiently short to prevent decreased yield of styrene due to depolymerization of the dimer.

Depending on the particular reaction conditions employed for the dehydrogenation, a smaller or greater proportion of the butenes and butanes in the mixture may be dehydrogenated to butadiene simultaneously with the dehydrogenation of the dimer to styrene. Catalytic dehydrogenation is generally advantageous from the standpoint of butadiene production in this step of my process.

The mixture leaving the dehydrogenation reaction zone should be immediately quenched, in order to minimize polymerization of the styrene, polymerization of butadiene produced in the dehydrogenation reaction, or co-polymerization of these compounds. For this purpose, the hot gas mixture may be contacted with cooled surfaces, but the quenching is preferably effected by the injection of water into the gas stream, as shown in the drawing.

The gas mixture, after quenching to a temperature of the order of 500° F., is suitably further cooled with water in a cooling tower to a temperature of about 200° F., after which, it is suitably subjected to absorption and fractional distillation, as shown in the drawing, to obtain a styrene fraction, an unreacted dimer fraction for recycle to the dehydrogenation reactor, a butane-butene-butadiene fraction for recycle to the dimerization reactor, and a gas fraction containing any hydrocarbons of less than four carbon atoms resulting from any cracking occurring in the dehydrogenation reactor. The butane-butene-butadiene fraction may suitably be further fractionated, and the butadiene recovered by azeotropic distillation, extractive distillation, or other known methods, instead of recycling to the dimerization reaction, as shown in the drawing. If this fraction is to be recycled, its butadiene content should preferably be at least as great as that of the fresh charge stock.

It may be seen that the process described above has the advantage of producing styrene from petroleum hydrocarbon fractions without the necessity for separating either butadiene or the butadiene dimer from the hydrocarbon fraction during processing. The process has the additional advantage of utilizing the other components of the hydrocarbon fraction in the dehydrogenation step of the process as reactants for the simultaneous production of butadiene.

It is to be understood that the process as illustrated in the drawing is only diagrammatic, and that numerous additional features might be employed in commercial operation, such as the use of heat exchangers to effect practical heat economy in the process. The process may also be modified in numerous respects, as, for example, by separating the dimer from the dimerization reactor effluent, by distillation or other suitable means, and then subjecting the relatively pure dimer to dehydrogenation. Various other methods of product recovery may likewise be used in place of the particular procedure illustrated. For example, when a dehydrogenation product is obtained which contains relatively large amounts of butadiene in addition to styrene, both compounds may be recovered by forming the copolymer, instead of recycling the butadiene and recovering the styrene separately. Common expedients which are employed in the production of styrene by other methods may be employed in conjunction with my process, as, for example, the use of polymerization inhibitors and vacuum distillation in the recovery and purification of the styrene produced.

It should be understood that catalysts may be employed in my process for the dimerization as well as for the dehydrogenation reaction. Catalysts which are used for the polymerization of olefins in the production of motor fuel hydrocarbons from petroleum fractions may be employed for the dimerization reaction in the present process. I prefer, however, to effect this step thermally, without the use of catalysts.

Any of the known dehydrogenation catalysts are suitable for the dehydrogenation of the alkenylcyclohexenes in my process. Metallic catalysts of the nickel and cobalt types, complex catalysts such as copper chromate and the like, and oxide catalysts such as the chromia-alumina and molybdena-alumina catalysts used in the dehydrogenation of petroleum hydrocarbons, are suitable for this purpose. I prefer to employ catalysts of the latter type, and especially chromium oxide-aluminum oxide catalysts, and catalysts comprising chromium oxide supported on kieselguhr, or an equivalent support. In effecting either the dimerization or the dehydrogenation reaction catalytically, the catalysts may be used in any of the known procedures, such as fixed bed or fluid catalyst operation.

When employing butane-butene-butadiene fractions obtained by the severe cracking of naphtha for butadiene production, the usual butadiene content will be of the order of 50 to 60 per cent. When such fractions are employed in the process described above, with recycle of the unreacted dimer fraction to the dehydrogenation reaction, and recycle of the butadiene fraction to the dimerization reaction, total yields of styrene may be obtained, which exceed the theoretical yield from the butadiene content of the original feed stock. This result may be obtained because of the formation of additional butadiene from the butenes or butanes in the dehydrogenation reactor.

It is to be understood, of course, that my invention is not limited to the specific procedure which has been described above, and that numerous modifications of the various steps in this process may be employed. In general, it may be said that the use of any equivalents or modifications of procedure which would naturally occur to those skilled in the art is included in the scope of my invention. Only such limitations should be imposed on the scope of my invention as are indicated in the following claims.

I claim:

1. A cyclic process for the production of styrene from a butane-butene-butadiene fraction obtained by the cracking of petroleum hydrocarbons, which comprises subjecting said fraction to a temperature of 650–950° F. under superatmospheric pressure to effect dimerization of butadiene, subjecting resulting mixture to a temperature of 1200–1400° F. during contact with a dehydrogenating catalyst comprising an oxide of the metals selected from the group consisting of chromium and molybdenum, at a total pressure of the order of 1 atmosphere, with a contact time of 0.1 to 0.001 second to effect dehydrogenation of butadiene dimer to styrene, and dehydrogenation of 4 carbon atom components of said mixture to butadiene, and recycling resulting butadiene to the dimerization step of the process.

2. A continuous process for the production of styrene from a butane-butene-butadiene fraction obtained in the conversion of petroleum hydrocarbons which comprises passing a stream of said fraction through a dimerization zone, subjecting the stream therein to an elevated temperature in the range 650 to 950° F. while under an elevated pressure in the range 400 to 1200 pounds, effecting substantial dimerization of butadiene in said zone, passing resulting hydrocarbon mixture through a dehydrogenation zone, subjecting the mixture therein to contact with a chromia-alumina dehydrogenating catalyst at a temperature of about 1200 to 1400° F., maintaining the hydrocarbon mixture and catalyst in contact with the catalyst at said temperature for not in excess of about 0.1 second such that butadiene dimer is converted to styrene in substantial amount, passing a stream of hydrocarbon reaction mixture from said dehydrogenating zone through a cooling zone, subjecting the mixture to contact therein with cooling water in amount sufficient to reduce the temperature to about 200° F., discharging water and tarry material removed from the hydrocarbons from said cooling zone, separately passing cooled hydrocarbons containing styrene from said cooling zone through an absorption zone, subjecting the cooled hydrocarbons to contact in said zone with a hydrocarbon absorption medium comprising hydrocarbon constituents of the reaction mixture higher boiling than styrene, discharging unabsorbed fixed gases from said absorption zone, passing the absorbed hydrocarbons and hydrocarbon absorption medium to a fractionating zone, forming therein a fraction comprising propane and lighter, a high boiling fraction comprising hydrocarbons higher boiling than styrene and an intermediate fraction comprising $C_4$ hydrocarbons, butadiene dimer and styrene, discharging the propane and lighter fraction, recycling said high boiling fraction at least in part to the absorption zone, passing said intermediate fraction to a final fractionating zone, forming in said final fractionating zone a $C_4$ hydrocarbon fraction, an unreacted dimer fraction and a styrene fraction, discharging said styrene fraction, recycling said $C_4$ fraction at least in part to said dimerization zone and recycling at least in part said unreacted dimer fraction to said dehydrogenating zone.

3. A cyclic process for the production of styrene from a butane-butene-butadiene fraction obtained by the cracking of petroleum hydrocarbons, which comprises subjecting said fraction to a temperature of 650–950° F. under superatmospheric pressure to effect dimerization of the butadiene, subjecting resulting mixture to a temperature of about 1200 to 1400° F., during contact with a dehydrogenating catalyst at a total pressure of the order of 1 atmosphere, with a contact time of not in excess of about 0.1 second to effect dehydrogenation of butadiene dimer to styrene, and dehydrogenation of 4 carbon atom components of said mixture to butadiene, and recycling resulting butadiene to the dimerization step of the process.

4. A continuous process for the production of styrene from a butane-butene-butadiene fraction obtained in the conversion of petroleum hydrocarbons which comprises passing a stream of said fraction through a dimerization zone, subjecting the stream therein to an elevated temperature in the range 650 to 950° F. while under an elevated pressure in the range 400 to 1200 pounds, effecting substantial dimerization of butadiene in said zone, passing resulting hydrocarbon mixture through a dehydrogenation zone, subjecting the mixture therein to contact with a dehydrogenating catalyst at a temperature of about 1200 to 1400° F., maintaining the hydrocarbon mixture and catalyst in contact with the catalyst at said temperature for not in excess of about 0.1 second such that butadiene dimer is converted to styrene in substantial amount, passing a stream of hydrocarbon reaction mixture from said dehydrogenating zone through a cooling zone, subjecting the mixture to contact therein with cooling water in amount sufficient to reduce the temperature to about 200° F., discharging water and tarry material removed from the hydrocarbons from said cooling zone, separately passing cooled hydrocarbons containing styrene from said cooling zone through an absorption zone, subjecting the cooled hydrocarbons to contact in said zone with a hydrocarbon absorption medium comprising hydrocarbon constituents of the reaction mixture higher boiling than styrene, discharging unabsorbed fixed gases from said absorption zone, passing the absorbed hydrocarbons and hydrocarbon absorption medium to a fractionating zone, forming therein a fraction comprising propane and lighter, a high boiling fraction comprising hydrocarbons higher boiling than styrene and an intermediate fraction comprising $C_4$ hydrocarbons, butadiene dimer and styrene, discharging the propane and lighter fraction, recycling said high boiling fraction at least in part to the absorption zone, passing said intermediate fraction to a final fractionating zone, forming in said final fractionating zone a $C_4$ hydrocarbon fraction, an unreacted dimer fraction and a styrene fraction, discharging said styrene fraction, recycling said $C_4$ fraction at least in part to said dimerization zone and recycling at least in part said unreacted dimer fraction to said dehydrogenating zone.

5. A continuous process for the production of styrene from a butane-butene-butadiene fraction obtained in the conversion of petroleum hydrocarbons which comprises passing a stream of said fraction through a dimerization zone, subjecting the stream therein to an elevated temperature in the range about 650 to 950° F. and under superatmospheric pressure to effect substantial dimerization of butadiene in said zone, passing resulting hydrocarbon mixture through a dehydrogenation zone, subjecting the mixture therein to contact with a dehydrogenating catalyst at a temperature of about 1200 to 1400° F., maintaining the hydrocarbon mixture and catalyst in contact with the catalyst at said temperature for not in excess of about 0.1 second so as to effect dehydrogenation of butadiene dimer to styrene and dehydrogenation of 4 carbon atom components of said mixture to butadiene, removing a stream of hydrocarbon reaction mixture from said dehydrogenating zone, separating from removed hydrocarbon reaction mixture a $C_4$ hydrocarbon fraction, an unreacted dimer fraction, and a styrene fraction, discharging said styrene fraction, recycling said $C_4$ fraction at least in part to said dimerization zone, and recycling at least in part said unreacted dimer fraction to said dehydrogenating zone.

6. A continuous process for the production of styrene from a butane-butene-butadiene fraction obtained in the conversion of petroleum hydrocarbons which comprises passing a stream of said fraction through a dimerization zone, subjecting the stream therein to an elevated temperature in the range about 650 to 950° F. and under superatmospheric pressure to effect substantial dimerization of butadiene in said zone, passing resulting hydrocarbon mixture through a dehydrogenation zone, subjecting the mixture therein to contact with a dehydrogenating catalyst at a temperature of about 1200 to 1400° F., maintaining the hydrocarbon mixture and catalyst in contact with the catalyst at said temperature for not in excess of about 0.1 second so as to effect dehydrogenation of butadiene dimer to styrene and dehydrogenation of 4 carbon atom components of said mixture to butadiene, removing a stream of hydrocarbon reaction mixture from said dehydrogenating zone, reducing the temperature of the removed stream to a temperature substantially below that prevailing in the dehydrogenating zone, fractionating from the cooled hydrocarbon mixture a $C_4$ hydrocarbon fraction an unreacted dimer fraction and a styrene fraction, discharging said styrene fraction, recycling said $C_4$ fraction at least in part to said dimerization zone, and recycling at least in part said unreacted dimer fraction to said dehydrogenating zone.

CLAUDE W. WATSON.